July 11, 1950  G. A. JUST, JR  2,514,872
INDICATING MEANS

Filed Sept. 3, 1949  2 Sheets-Sheet 1

INVENTOR.
GEORGE A. JUST, Jr.
BY
Brown, Denk & Lynnestvedt
AGENTS

July 11, 1950 G. A. JUST, JR 2,514,872
INDICATING MEANS

Filed Sept. 3, 1949 2 Sheets-Sheet 2

INVENTOR.
GEORGE A. JUST, Jr.
BY
Brown, Denk & Lynnestvedt
AGENTS

Patented July 11, 1950

2,514,872

UNITED STATES PATENT OFFICE 2,514,872

INDICATING MEANS

George A. Just, Jr., Philadelphia, Pa., assignor to Philco Corporation, Philadelphia, Pa., a corporation of Pennsylvania Application September 3, 1949, Serial No. 113,979

2 Claims. (Cl. 116—124.2)

The present invention is concerned with indicating apparatus and, more particularly, relates to visual indicators for use with instrument scales, and the like.

The invention, while of broader applicability, is particularly useful with radio apparatus, and is therefore illustrated and described in association therewith.

It has been known, prior to the present invention, to provide radio dial indicators which move with rectilinear motion, and indicating devices have been devised in which the indicator or pointer travels in a circular or other arcuate path, but always about a center which lies at some point within the physical structure of the radio cabinet. Such indicating devices have frequently left much to be desired, particularly in that they do not lend themselves well to pleasing and varied cabinet designs. In the case of indicators which have moved in an arcuate path, the necessity for laying out the dial scale on an arc the center of which falls within the cabinetry, has sharply limited the utility of such arrangements.

It is the primary object of the present invention to provide improved indicating means which is inherently versatile, from the standpoint of the variations of overall design treatment which can be accommodated.

With more particularity, the invention has as an object the provision of indicating apparatus in which the pointer is adapted to move in a curved, or other arcuate path, and about a center which may lie at a point outside the cabinet structure. It is a feature of the apparatus of my invention that the designer may choose from a variety of paths of pointer motion, without departing from the advantageous basic aspects of the invention.

In the achievement of the foregoing general ends, the apparatus of the invention employs a plate or frame comprising track means having suitably curved peripheral edge portions about which a carriage—carrying the pointer element—is adapted to move. A flexible driving element or cord is drivingly associated with the carriage, and novel means is provided to confine the movements of the drive cord to a path generally paralleling the curvature of the track. In this way driving force is applied to the carriage in a direction along the curved path, regardless of the specific curvature which may be chosen, thereby reducing the necessary driving pressure to a minimum. While, in the interest of simplicity of illustration, the apparatus is shown as including a pointer adapted to move in a path curved in one plane only, it is a feature of the invention that the track may have curvature in two coordinate planes.

The invention extends further to certain novel constructional features and arrangements, hereinafter described and illustrated in the accompanying drawings, in which.

Figure 1:
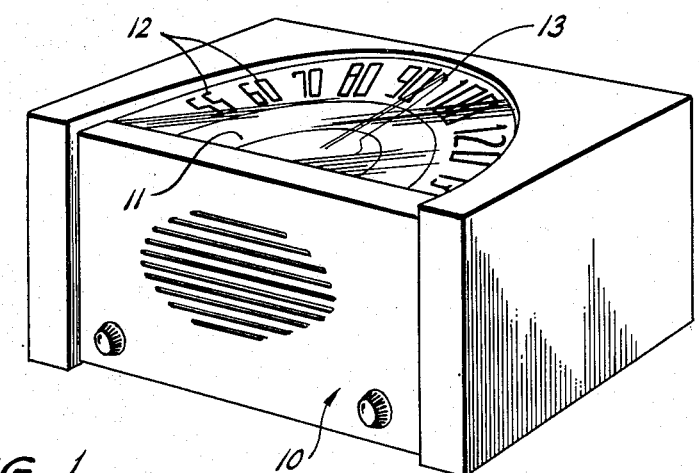
Figure 1 is a view, in perspective, of a radio receiver embodying indicating apparatus constructed in accordance with the present invention.

Now making more particular reference to the drawings, there is illustrated in Figure 1 a radio cabinet, designated generally by the reference numeral 10, having an upwardly presented transparent dial cover 11, suitable indicia 12 laid out on a circular path and underlying said cover, and a transparent indicator or pointer element 13, adapted for arcuate movement beneath the transparent cover and with respect to the numerals of the scale. A metallic plate underlies the pointer 13 to mask the radio chassis from view, this plate being centrally apertured to accommodate attachment of the pointer to the parts which actuate the same (see Figure 3).

Figure 2:
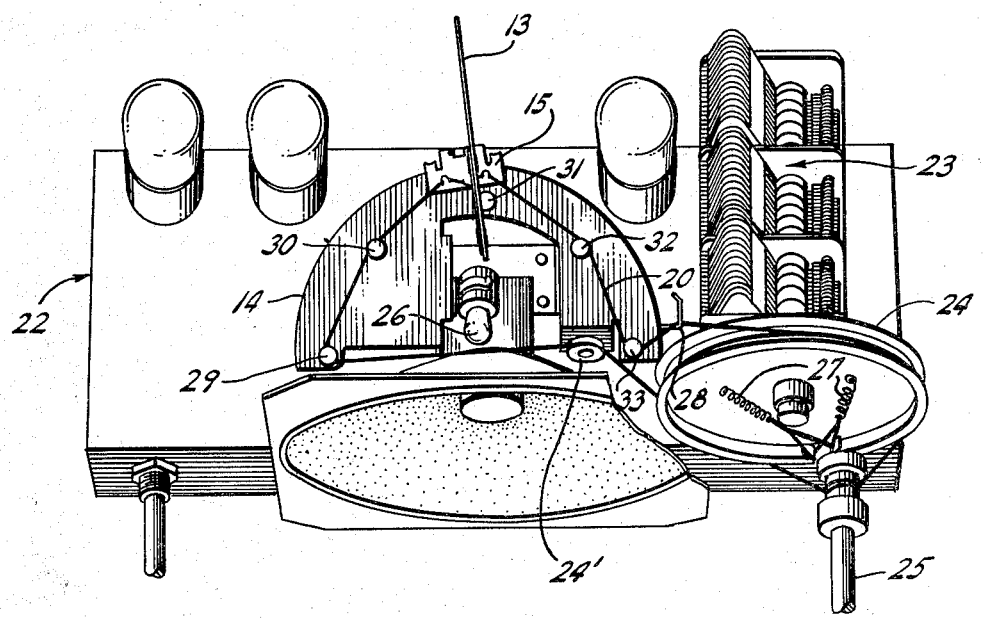
Figure 2 is a perspective view, on an enlarged scale, illustrating the application of the invention to a typical radio chassis.
Figure 3:
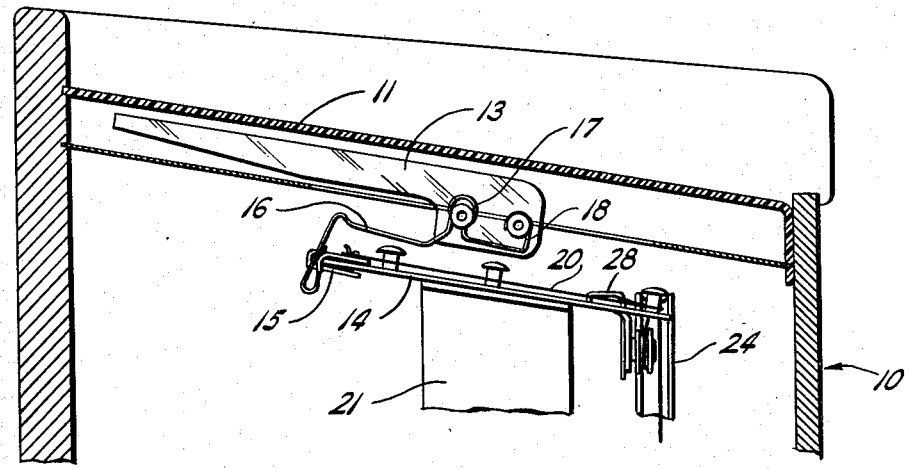
Figure 3 is a fragmentary, vertical sectional view, taken through apparatus of the type illustrated in Figure 1, and showing, on a considerably larger scale, certain details of the pointer driving arrangement.

As appears to best advantage in Figures 2 and 3, the indicating apparatus includes a track or plate 14 which, in the embodiment illustrated, is semi-circular in shape, a carriage member 15 being engaged with the peripheral edge of plate 14 and being adapted for movement thereabout. While, within the broader aspect of the invention, the carriage 15 may be of any desired type, in the embodiment illustrated the carriage is U-shaped in cross-section (see Figure 3), in order to engage the peripheral edge of the plate or track 14 and carries a support member 16 which overlies the plate 14 and is provided with curved portions 17 and 18, whereby to support the pointer 13. Preferably the spring member 16 is in alignment with and underlies the pointer 13, in order that the pointer may appear to be unsupported, as seen from a normal viewing position above the dial scale.

Figure 4:
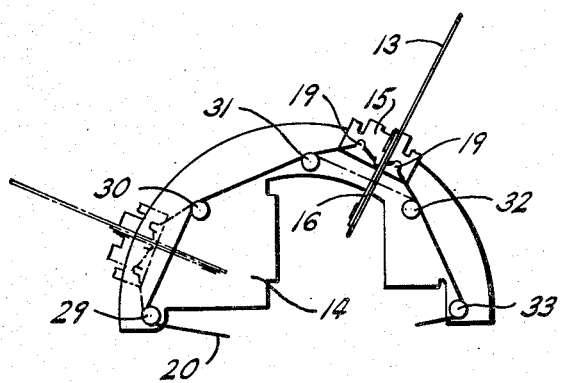
Figure 4 is a fragmentary view, in perspective, illustrating the pointer, per se, in association with fragmentary portions of the pointer-support means.

As clearly appears in Figure 4, the carriage is provided with a plurality of lugs 19 "struck up" from the metal of said carriage and adapted to make frictional engagement with a flexible driving element or cord 20. The above-described assembly is carried by a vertically extending mounting bracket 21 (Figure 3), which serves to support the plate, and the elements carried thereby, in suitable spaced relation with respect to the radio chassis 22. As will be appreciated, the invention is not concerned with the radio apparatus, per se, except insofar as the elements thereof cooperate with the novel indicating apparatus of the invention. In the exemplary arrangement illustrated, the radio circuits are tuned through the agency of a variable condenser 23, of known type, said condenser being provided with the usual drive pulley 24 and a manually operable tuning shaft 25.

In particular accordance with this invention, and as will be readily apparent from consideration of Figure 2, the peripheral edge of plate 14 is so configured and disposed with respect to the chassis 22, that the pointer or indicator 13 moves in an arcuate path having a center lying well forwardly of the chassis. Further, the pointer does not extend completely back to the center of motion. These factors are of considerable importance in the realization of versatile and pleasing designs, and also make it possible to place an indicating lamp, shown at 26, in a location near the center of the dial scale.

To effect movement of the pointer 13 in correspondence with the adjustment of the variable condenser, the driving arrangement (which will be fully described in what follows) is such that the drive cord 20 encircles the drive pulley 24 and the shaft 25, the free ends of said drive cord being fixed to the pulley 24 through the agency of tension springs 27, and in a manner well known in this art. As clearly appears in Figure 3 the upper peripheral edge of the pulley 24 is approximately tangent to the plane of the plate 14, in order that the upper run of the drive cord 20 may pass freely across and on to the pulley 24. The lower run is guided in its movement toward the drive pulley through the agency of a small guide wheel or pulley, shown at 24' in Figure 2. A finger 28 (see particularly Figure 2) is engaged with the drive cord, serving to guide the same in its movement toward the pulley. The manner in which the cord is engaged with the pulley and with the drive shaft 25 represents conventional practice, and need not be described in greater detail herein.

Although, in its broader aspects, the invention contemplates a variety of means for confining movements of the drive cord in a path generally paralleling the arcuate edge of track or plate 14, the arrangement illustrated is particularly advantageous.

Figure 5:
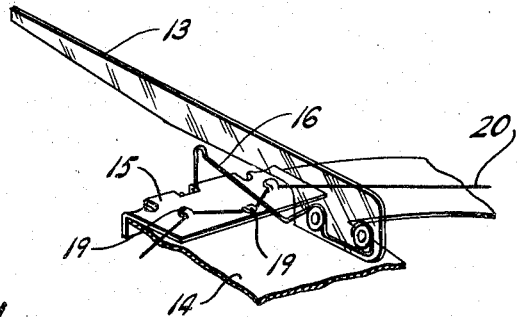
Figure 5 is a view of the track and cooperating cord-guide means, the view also illustrating the pointer in two positions of adjustment.

In order that the carriage member 15 may always be urged radially with respect to and inwardly of the plate 14—to insure firm and proper seating of said carriage member—it is necessary that the drive cord exert force against said carriage in a radial direction with respect to the plate 14. This is desirable in all positions which the carriage may assume about the curved track. Further, in order that the force required to move the shaft 25 shall remain small, the portions of the drive cord overlying plate 14 must move—throughout the range of adjustment of the carriage—in a path generally paralleling the arcuate peripheral edge of the track plate. These requirements are simply fulfilled by the illustrated mechanism and to accomplish these purposes, the drive cord 20 is confined in a path of movement defined by a plurality of studs upstanding from the plate 14 and shown in the drawing at 29 to 33, inclusive. As is well illustrated in Figure 5, these studs serve to maintain the drive cord in the proper arcuate path, thereby facilitating easy driving of the mechanism, and yet, as the carriage moves about the track, the portions of the cord adjacent the carriage advance into and move out of engagement with the studs in such manner that the cord portions adjacent the carriage are always so angled with respect the center line of said carriage as to urge said carriage inwardly toward the center of curvature of the edge of plate 14.

This particular arrangement is further advantageous in that, by varying the distance between the adjacent cord guide-studs, it is possible to control the speed of pointer movement, for a given rotary displacement of the shaft 25, in various sectors of the arcuate path of travel of said pointer. For example if the studs be located further from the edge of the plate along a portion only of the length of the arc, in said portion—and for a given displacement of the drive cord—greater travel of the cord will occur in a direction along the curved edge of plate 14.

The two-fold purpose served by the particular means utilized to confine movements of the drive cord may be further illustrated by pointing out that while it might at first appear that the cord could pass directly from the stud 29 to the carriage member and from thence to the stud 33, in practice such an arrangement would be objectionable in that a very substantial component of the force applied to the carriage would be exerted radially of the plate 14, and the friction would be increased unduly. By the inclusion of additional studs, for example, those studs shown at 30, 31, and 32, the portions of the cord lying intermediate the carriage and either of the studs 29 or 33 are caused to approach the arcuate edge of plate 14, thus increasing the force available to move the carriage in the direction of curvature of its guiding track, without eliminating a small desirable component of force exerted in a radial direction with respect to the plate.

From the foregoing description it will be clear that the present invention provides a novel type of visual indicator which is simple and inexpensive to manufacture, and highly reliable in operation. Accurate and distinct indication of the frequency to which radio apparatus is tuned is a significant factor from the sales acceptance point of view, and the disclosed apparatus affords these advantages while yet lending itself to unusual and decorative cabinet designs.

I claim:

1. Indicating apparatus for use with a scale or other reference element, which apparatus comprises: a flat track plate having a curved peripheral edge portion, carriage means engaged with said edge portion and adapted for sliding movements therealong in substantial conformity with the curvature thereof and in the plane of said track plate, an elongate flexible driving element having a run thereof in driving association with said carriage means, means for imparting driving movements to said flexible driving element, and a plurality of individual abutments upstanding from said track plate and spaced about and inwardly of the curved peripheral edge portion thereof, said abutments being disposed to make contact with said flexible driving element and to confine movements of said element in a path generally paralleling the curvature of said edge portion.

2. In indicating apparatus, a cabinet having an opening in one side wall thereof, a flat track plate disposed within said cabinet in confronting relation with respect to said opening and having a curved peripheral edge portion, carriage means engaged with said edge portion, a plurality of individual abutments upstanding from said track plate and spaced about and inwardly of the curved peripheral edge portion, an elongate flexible driving element having a portion thereof in driving association with said carriage means, said abutments being disposed to make contact with said flexible driving element and to confine movements of the same in a path generally paralleling the curvature of said edge portion, whereby to provide for sliding movements of said carriage means along said edge portion in substantial conformity with the curvature thereof and in the plane of said track plate, a pointer member supported upon said carriage means for movement therewith and overlying said track plate, and dial means including a transparent covering spanning said opening and being provided with indicia disposed to define an arcuate dial in registry with the path of movement of said carriage means and pointer member.

GEORGE A. JUST, JR.

REFERENCES CITED

The following references are of record in the file of this patent:

UNITED STATES PATENTS

| Number | Name | Date |
|---|---|---|
| 2,397,306 | Whipple | Mar. 26, 1946 |

FOREIGN PATENTS

| Number | Country | Date |
|---|---|---|
| 451,146 | Great Britain | July 30, 1946 |